United States Patent [19]

Hahn

[11] Patent Number: 5,032,268

[45] Date of Patent: Jul. 16, 1991

[54] SELF-CONTAINED CANISTER UNIT FOR FILTERING TAP WATER

[75] Inventor: Robert W. Hahn, Grafton, Wis.

[73] Assignee: Wallace von Medlin, Burlingame, Calif.; a part interest

[21] Appl. No.: 395,278

[22] Filed: Aug. 17, 1989

[51] Int. Cl.$^5$ .............................................. C02F 9/00
[52] U.S. Cl. ..................... 210/256; 210/266; 210/282
[58] Field of Search ............ 210/652, 669, 694, 257.2, 210/260, 261, 266, 282, 449, 500.32, 256

[56] References Cited

U.S. PATENT DOCUMENTS

| | | | |
|---|---|---|---|
| 4,026,978 | 5/1977 | Mungle et al. | 210/500.32 |
| 4,711,723 | 12/1987 | Bray | 210/694 |
| 4,911,840 | 3/1990 | Underwood | 210/321.83 |

Primary Examiner—Ivars Cintins

[57] ABSTRACT

A water filtering canister unit having self-contained reverse osmosis and activated carbon filtering systems which are adapted for connection onto the water tap in a home, apartment or office. The canister unit includes a housing defining an inner chamber in which a cylindrical reverse osmosis membrane is mounted. Water molecules which pass through the membrane continue through a capsule containing a body of activated carbon particles and thence outwardly through a discharge conduit. Dissolved salts and minerals as well as particulate matter rejected by the membrane are discharged in brine water at a controlled rate through a lower end cap on the housing.

3 Claims, 2 Drawing Sheets

SELF-CONTAINED CANISTER UNIT FOR FILTERING TAP WATER

This invention relates in general to the filtration of water for human consumption. More particularly, the invention relates to filtering tap water for human consumption in homes, apartments, offices and the like.

The deterioration in the quality of water for human consumption has been of increasing concern. Among the water contaminants that have come to light are the presence of toxic substances in the water supply. These toxic substances include dissolved salts and minerals such as lead, fluoride, cadmium, sodium, arsenic, nitrates and aluminum. The presence of sodium in the tap water is of particular concern to individuals on a restricted sodium diet. Other objectionable substances commonly found in tap water are organic compounds such as pesticides, herbicides, plastics, solvents and fertilizers. The continued ingestion of the highly toxic substances such as lead can result in lead poisoning and other health problems, particularly in children and pregnant women. The dangers raised by these concerns have brought on such measures as bottled water for drinking purposes, but this is relatively expensive and cumbersome.

Among the prior art method and apparatus for filtering water are reverse osmosis filter systems and activated carbon systems. The conventional reverse osmosis systems employ semi-permeable membranes which remove certain dissolved salts and minerals as well as particulates carried by the water. Activated carbon is used for removing certain organic compounds in the water and to improve its taste. Heretofore water filter systems have been provided in which a reverse osmosis unit is used in combination with an activated carbon unit. However, these combined system typically are relatively complicated and expensive to install and are not readily adapted for point-of-use installation by a consumer or homeowner at the water tap of a kitchen, bathroom or other similar location in a home, apartment or office.

It is therefore an object of the present invention to provide a tap water filtering unit with reverse osmosis and activated carbon filters combined in a self-contained canister unit adapted for point-of-use installation at the tap.

Another object is to provide a self-contained water filter canister unit of the type described which can be readily installed by the consumer on the water tap in a home, apartment or office for producing a continuous stream of filtered water which can be collected for subsequent use.

Another object is to provide a self-contained water filter canister unit of the type described which is installed on a water tap and continuously operates to filter out contaminants from the water while producing a stream of potable water.

The invention in summary provides a water filter canister unit comprised of a housing having an outer wall which encloses an inlet chamber, a reverse osmosis membrane of cylindrical shell configuration mounted within the inlet chamber, and a body of activated carbon particles mounted coaxially within the outer wall of the membrane. Coupling means is provided for releasably mounting the inlet end of the housing to a water tap. A pre-filter is provided for filtering out particulate matter in the stream leading into the housing, and aperture means is formed through the outlet end of the housing for controlling the rate of water discharge to maintain sufficient water pressure in the inlet chamber to drive water molecules through the membrane. Dissolved salts and minerals as well as particulate matter rejected by the membrane are passed along the inlet chamber and out through the aperture means. Water which permeates through the membrane passes across the activated carbon particles and out of the housing through a discharge conduit from which the water is collected for human consumption.

The foregoing and additional objects and features of the invention will appear from the following description in which the preferred embodiment has been described in conjunction with the accompanying drawings.

Figure 1:
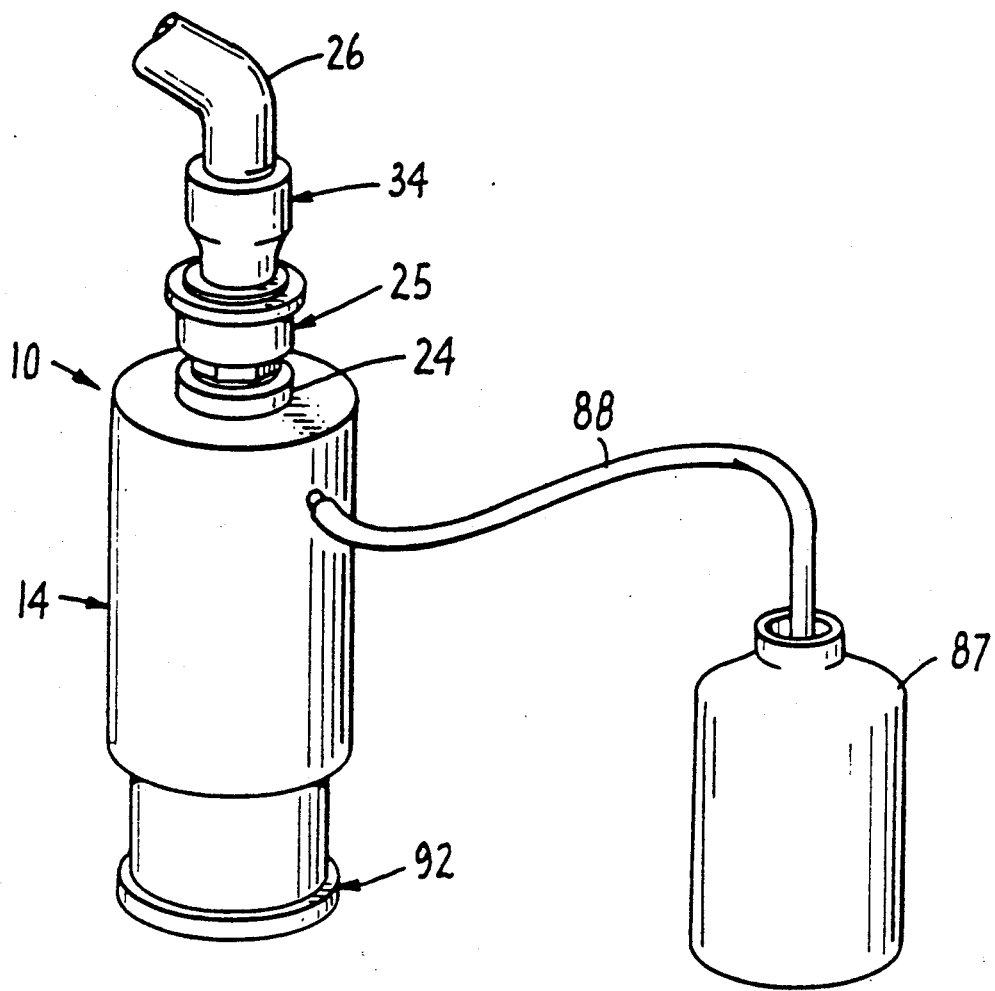
FIG. 1 is a perspective view of a self-contained canister unit of the invention shown installed on a water tap.
Figure 3:
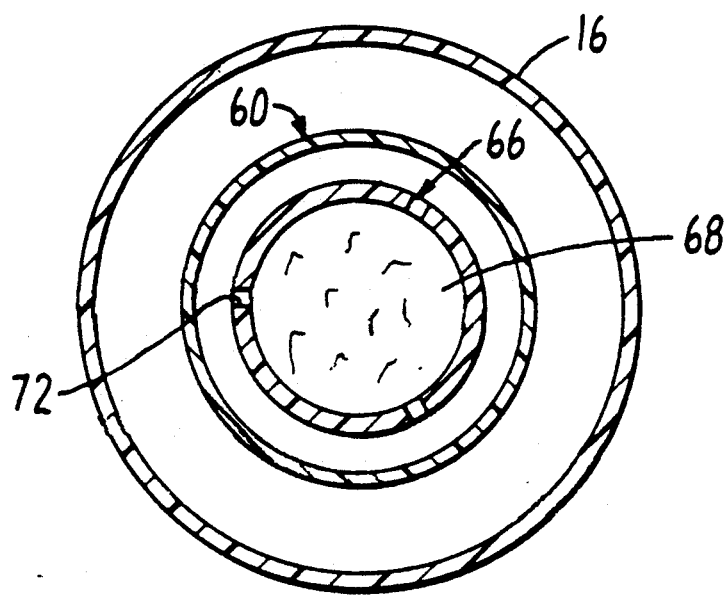
FIG. 3 is a cross-sectional view taken along the line 3—3 of FIG. 2.
Figure 2:
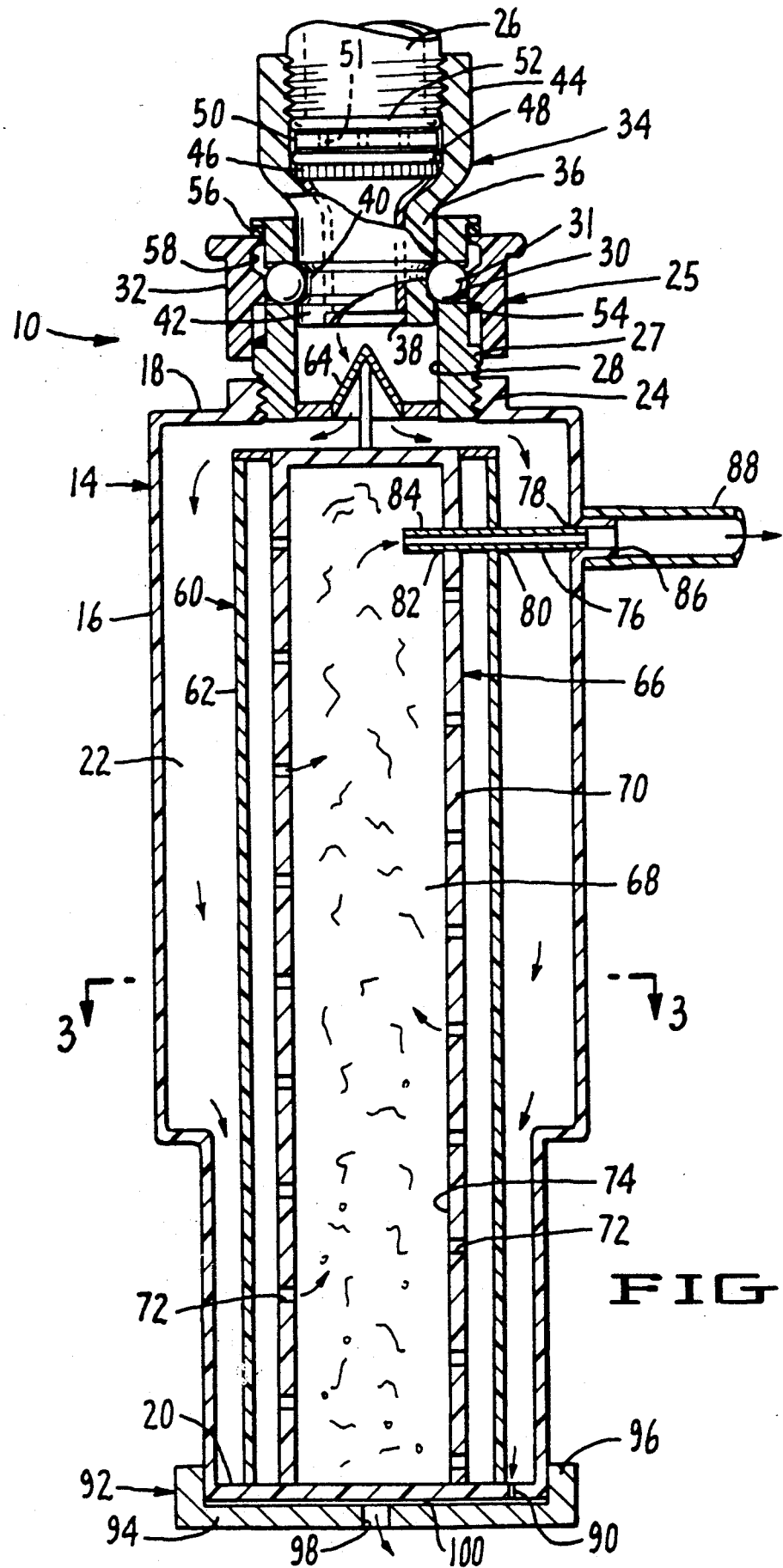
FIG. 2 is a vertical section view to an enlarged scale of the canister unit of FIG. 1.

In the drawings a canister unit for filtering water in accordance with the preferred embodiment of the invention is illustrated generally at 10. Canister unit 10 is comprised of a housing 14 having an outer cylindrical wall 16, an upper inlet end 18 and a lower outlet end 20. The housing wall and inlet and outlet ends are preferably molded as a unit from a suitable hard, durable and water-impervious plastics material. The housing encloses an inlet chamber 22 which opens upwardly through a reduced diameter circular rim 24 formed on the inlet end. The rim 24 is threaded internally.

Coupling means is provided for mounting the housing to the water tap and includes a bushing 27 having a central flow passage 28. The bushing 27 is threaded at its lower end for mounting within the threads of rim 24. At the inner surface of the upper end of the bushing three circumferentially spaced recesses 30 are provided, each of which mounts respective retainer balls 31 for radial movement. A collar 32 formed of a suitable plastics material is mounted about the upper end of the bushing. The coupling means further includes a faucet adapter 34 comprising a body 36 having a central passage 38 which communicates with the bushing. The lower end of body 36 is formed about its circumference with a groove 40 and a circular enlarged end 42 having an outer diameter commensurate with the inner diameter of the bushing. The balls 31 snap into groove 40 to releasably retain faucet adapter 34 onto the bushing.

The upper end of adapter body 36 is formed with an enlarged end 44 which internally carries a metal sediment screen 46. The screen 46 has foramen sized to pass water while occluding passage of substantial portions of particulate matter, such as refuse particles, carried in the tap water. A spacer ring 48, preferably of a plastics material, is press fit within the adapter body to hold the screen in place.

A circular disk 50 formed with a plurality of large-size holes 51 is mounted above spacer ring 48. The series of holes in the disk provide a pre-filter and aeration for the incoming water. Disassembly of the coupling means from the water tap permits the user to remove disk 50 and sediment screen 46 for periodic cleaning.

The upper end of adapter body 36 is threaded internally for detachable connection to the external threads which are typically provided on the end of the water tap or faucet 26. A rubber washer 52 is fitted above disk 50 to provide a water-tight seal with the faucet. As required, any existing aerator which may be attached to the threads of the tap would first be removed to permit installation of canister unit 10.

Collar 32 is internal bored and is yieldably urged upwardly by a spring 54 against the stop provided by a snap ring 56 which is mounted in a groove formed about the upper end of bushing 27. The upper end of the collar bore is beveled to form a camming surface 58. When collar 32 is moved upwardly by the action of spring 54, camming surface 58 urges the spherical balls inwardly to releasably lock with the groove 40 of adapter 34. This configuration permits the canister housing to be releasably installed by a simple upward motion which snaps the adapter and bushing together. When it is desired to release the canister, collar 32 is manually urged downwardly by the user to thereby move the camming surface 58 away from the balls, freeing them from groove 40. Bushing 27 and housing 14 can then be pulled downwardly and away from the tap adapter.

A reverse osmosis membrane 60 is mounted within inlet chamber 22 and is comprised of an outer wall 62 of cylindrical shell configuration disposed with its longitudinal axis coaxial of housing 14. The reverse osmosis membrane is comprised of a suitable semi-permeable material, such as cellulose triacetate, which slowly allows water molecules to pass through while rejecting dissolved salts, minerals and suspended particles. A membrane material of cellulose triacetate is capable of removing such dissolved salts and minerals as lead, fluorides, cadmium, aluminum, sodium, arsenic and nitrates. Such a membrane is also capable of removing smaller size particulates such as sand and clay which pass through the pre-filter.

An upwardly converging conical screen 64 is mounted above membrane 60 coaxial within the opening formed by rim 24 of housing inlet end 18. This screen functions to deflect and distribute the incoming flow of tap water into inlet chamber 22 and about the outer surface of the reverse osmosis membrane.

A capsule 66 containing a body of activated carbon particles 68 is mounted coaxially within the outer wall 62 of the reverse osmosis membrane. Capsule 66 is comprised of a cylindrical shell 70 formed with a plurality of spaced openings 72 which pass water into an inner chamber 74 in which the activated carbon particles are packed. As is well known, the activated carbon particles provide a very large surface area for absorption of organic compounds, and the interstitial spaces between the particles permit the water to permeate through the capsule.

Discharge conduit means is provided for discharging filtered water from the inner chamber of capsule 66. The conduit means comprises a discharge tube 76 which penetrates radially through an opening 78 provided in the upper end of the housing wall, thence through an opening 80 in the membrane and thence through an aligned opening 82 formed at the upper end of the capsule. The inlet end 84 of the tube is disposed at the upper end of the body of activated carbon particles. The housing is formed with a discharge spout 86 about opening 78. A flexible plastics tube 88 has one end mounted about spout 86 for directing the filtered water to a suitable container 87 where it is stored to provide the fresh water supply for human consumption.

Aperture means is provided at the lower end of housing 14 for controlling drainage of the brine water containing the rejected salts, minerals and particles. The aperture means includes at least one pinhole 90 formed through housing outlet end 20. The pinhole is sized with a predetermined diameter which controls the drainage of water from the housing at a rate which maintains the magnitude of water pressure within inlet chamber sufficient to drive water molecules through the membrane. Preferably the diameter of pinhole 90 is on the order of 0.015" where the pressure range of the tap water is 40 to 100 psi at a water temperature range of 45° to 95° F. An end cap 92 is provided for the housing and comprises an end wall 94 with an upwardly extending circular rim 96. The inner diameter of rim 96 is sized for a snug, friction fit about the lower end of housing 14. At least one discharge opening 98 having a relatively large diameter on the order of 5 mm is formed through cap end wall 94. The end wall extends across the outer surface of the housing end 20, and a narrow, flat plenum chamber 100 is formed between these two parts. Water draining through pinhole 90 fills this plenum chamber and creates a back pressure which assists in limiting the rate of water drainage through the pinhole. The brine water then drains from the plenum through opening 98 and falls away for subsequent disposal, such as in the drain of the sink.

In operation, the canister unit 10 is mounted onto the fresh water tap in the manner described above. The water valve is turned on to deliver tap water down through pre-filter and aerator disk 50, sediment screen 46 and thence into the inlet end of housing 14. Deflector screen 64 diverts the incoming flow of water radially outwardly and downwardly along the inlet chamber 22 about membrane 60. The controlled rate of water drainage through pinhole 90 causes water pressure to build up within inlet chamber 22 sufficient to drive water molecules through membrane by the action of reverse osmosis. Dissolved salts and minerals as well as particulate matter rejected by the membrane are carried downwardly to the lower end of the housing where they are discharged through the pinhole into plenum chamber 100 and thence through end cap opening 98. Water permeating inwardly through membrane 60 flows through the openings 72 of capsule 66 and into contact with the activated carbon particles which remove substantial portions of organic compounds. The filtered and freshened water continues upwardly where it enters discharge conduit 76. The reverse osmosis pressure acts to push the water through the discharge conduit and out of the canister unit into tube 88 for collection and subsequent use by the consumer. With the tap water pressure in the range of 40 to 100 psi and at a temperature range of 45° to 95° F. approximately three gallons of filtered and fresh water can be produced in a 24-hour period.

While the foregoing embodiments are at present considered to be preferred it is understood that numerous variations and modifications may be made therein by those skilled in the art as fall within the true spirit and scope of the invention as expressed in the appended claims.

What is claimed is:

1. A self-contained canister unit for point-of-use filtration of water from a tap, said canister unit comprising the combination of a housing having an outer cylindrical wall together with an inlet end and an outlet end which enclose an inlet chamber, coupling means for mounting the inlet end of the housing to the tap and for providing a water flow channel from the tap into the inlet chamber, a reverse osmosis membrane having an outer wall of cylindrical shell configuration with its longitudinal axis disposed within the inlet chamber substantially coaxial of the housing, said cylindrical shell enclosing an inner chamber, said reverse osmosis membrane passing water molecules from the inlet chamber to the inner chamber while rejecting passage of minerals, dissolved salts and particulate matter carried by the water, a body of activated carbon particles within the inner chamber for removing substantial portions of organic compounds carried by water permeating through the membrane into the inlet chamber, a discharge conduit mounted through the outer wall of the housing with an inlet end communicating with the water in the inner chamber and an outlet end on the outside of the housing for directing filtered water to an end use application, aperture means formed through the housing for controlling water discharge from the inlet chamber at a rate which maintains a predetermined magnitude of water pressure within the inlet chamber sufficient to drive water molecules through the membrane, and a pre-filter mounted within the coupling means across the flow channel, said pre-filter having foramen of a size which passes water and which occludes substantial portions of particulate matter carried by the water from the tap.

2. A canister unit as in claim 1 which includes deflector screen means carried above the reverse osmosis membrane for deflecting the incoming flow of water from the coupling means into the inlet chamber about the outer wall of the membrane.

3. A canister unit as in claim 1 in which the aperture means includes at least one pinhole formed through the outlet end of the housing for draining water from the inlet chamber, an end cap mounted about the lower end of the housing, said end cap having an end wall extending across the outer surface of the outlet end and forming a plenum chamber therewtih, and at least one discharge opening formed through the end wall, said pinhole having a predetermined diameter which controls the drainage of water from the inlet chamber into the plenum chamber at said rate which maintains water pressure within the inlet chamber of the housing.

* * * * *